(12) United States Patent
Phelps et al.

(10) Patent No.: US 9,712,674 B2
(45) Date of Patent: Jul. 18, 2017

(54) THIRD-PARTY CALL CONTROL OVER SECURE DUPLEX COMMUNICATION CHANNEL

(71) Applicant: Verizon Patent and Licensing Inc., Arlington, VA (US)

(72) Inventors: David E. Phelps, Colorado Springs, CO (US); Brian S. Badger, Divide, CO (US); Gregory J. Bjornberg, Colorado Springs, CO (US); Steven W. Statham, Monument, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 102 days.

(21) Appl. No.: 14/731,580

(22) Filed: Jun. 5, 2015

(65) Prior Publication Data

US 2016/0360038 A1 Dec. 8, 2016

(51) Int. Cl.
*H04M 3/51* (2006.01)
*H04L 5/14* (2006.01)
*H04M 3/523* (2006.01)
*H04M 7/12* (2006.01)

(52) U.S. Cl.
CPC ............ *H04M 3/5166* (2013.01); *H04L 5/14* (2013.01); *H04M 3/523* (2013.01); *H04M 7/128* (2013.01); *H04M 2203/609* (2013.01)

(58) Field of Classification Search
CPC ........... H04L 5/14; H04L 5/1423; H04L 5/16; H04N 1/00822; H04N 1/2369; H04N 2201/33335; H04N 2201/33364; H04W 76/005; H04W 84/08

USPC ........................................................ 370/276
See application file for complete search history.

(56) References Cited

U.S. PATENT DOCUMENTS

| | | | |
|---|---|---|---|
| 8,572,370 B1* | 10/2013 | Tormasov ............ | H04L 63/0428 709/220 |
| 2003/0174830 A1* | 9/2003 | Boyer ..................... | H04M 3/51 379/265.02 |
| 2003/0177017 A1* | 9/2003 | Boyer .................. | G06Q 30/016 705/304 |
| 2006/0256950 A1* | 11/2006 | Patel ..................... | H04M 3/493 379/265.02 |
| 2006/0256956 A1* | 11/2006 | Lee ..................... | H04M 3/5166 379/266.01 |
| 2008/0240407 A1* | 10/2008 | Srinivasa-Murthy ............... | H04M 3/5166 379/265.11 |
| 2010/0278318 A1* | 11/2010 | Flockhart ............... | G10L 17/26 379/88.04 |

(Continued)

*Primary Examiner* — Chi H Pham
*Assistant Examiner* — Robert Lopata

(57) ABSTRACT

A network device in a service provider network receives an incoming call, from a caller, to a telephone number associated with a customer. The network device applies to the call an interactive voice response (IVR) script corresponding to the customer and determines that the caller wants to speak to an agent. The network device establishes a secure duplex communication channel between the network device and an automatic call distributor (ACD) for the customer. The secure duplex communication channel is dedicated for use in managing the incoming call. The network device informs the ACD, via the secure duplex communication channel, that an agent is needed for the incoming call and receives, via the secure duplex communication channel, instructions from the ACD to manage the incoming call.

20 Claims, 12 Drawing Sheets

(56) References Cited

U.S. PATENT DOCUMENTS

| | | | | |
|---|---|---|---|---|
| 2012/0195422 A1* | 8/2012 | Famous | ............... | H04M 3/5232 |
| | | | | 379/265.09 |
| 2013/0046571 A1* | 2/2013 | Tuchman | ................ | G06Q 10/06 |
| | | | | 705/7.14 |
| 2013/0173687 A1* | 7/2013 | Tuchman | ............ | G06Q 30/0601 |
| | | | | 709/202 |
| 2013/0176413 A1* | 7/2013 | Lowry | ................. | H04M 3/5175 |
| | | | | 348/77 |
| 2013/0301688 A1* | 11/2013 | Khandani | .............. | H04W 16/14 |
| | | | | 375/211 |
| 2014/0068737 A1* | 3/2014 | Micucci | ................. | H04L 63/029 |
| | | | | 726/7 |
| 2014/0126717 A1* | 5/2014 | Wang | ................... | H04M 3/5166 |
| | | | | 379/265.11 |
| 2014/0237585 A1* | 8/2014 | Khan | ...................... | H04L 63/16 |
| | | | | 726/15 |
| 2014/0270135 A1* | 9/2014 | Odinak | ............... | H04M 3/5175 |
| | | | | 379/265.03 |
| 2015/0310446 A1* | 10/2015 | Tuchman | ............. | G06Q 30/016 |
| | | | | 705/304 |

\* cited by examiner

THIRD-PARTY CALL CONTROL OVER SECURE DUPLEX COMMUNICATION CHANNEL

BACKGROUND

Companies often use call centers to address consumer inquiries, take consumer orders, and/or resolve consumer problems. Interactive voice response (IVR) systems are frequently used to initially interact with a caller to obtain information regarding the call and, if possible, to provide automated responses. When automated information from the IVR system is not able to satisfy the caller, the caller's call is often transferred to a device associated with a human agent to service the inquiry and provide desired assistance. Routing of a caller's call to an agent may be managed using automatic call distributors (ACDs), which are often provided as a service from a third-party. As call centers migrate to a Voice over Internet Protocol (VoIP) and/or Session Initiation Protocol (SIP) environment, capacity of ACDs may increase, and ACDs may manage a large number of agents. Management of business rules for selecting agents from a large number of ACDs and/or a large number of agents may be quite complicated.

DETAILED DESCRIPTION OF PREFERRED EMBODIMENTS

Figure 1:
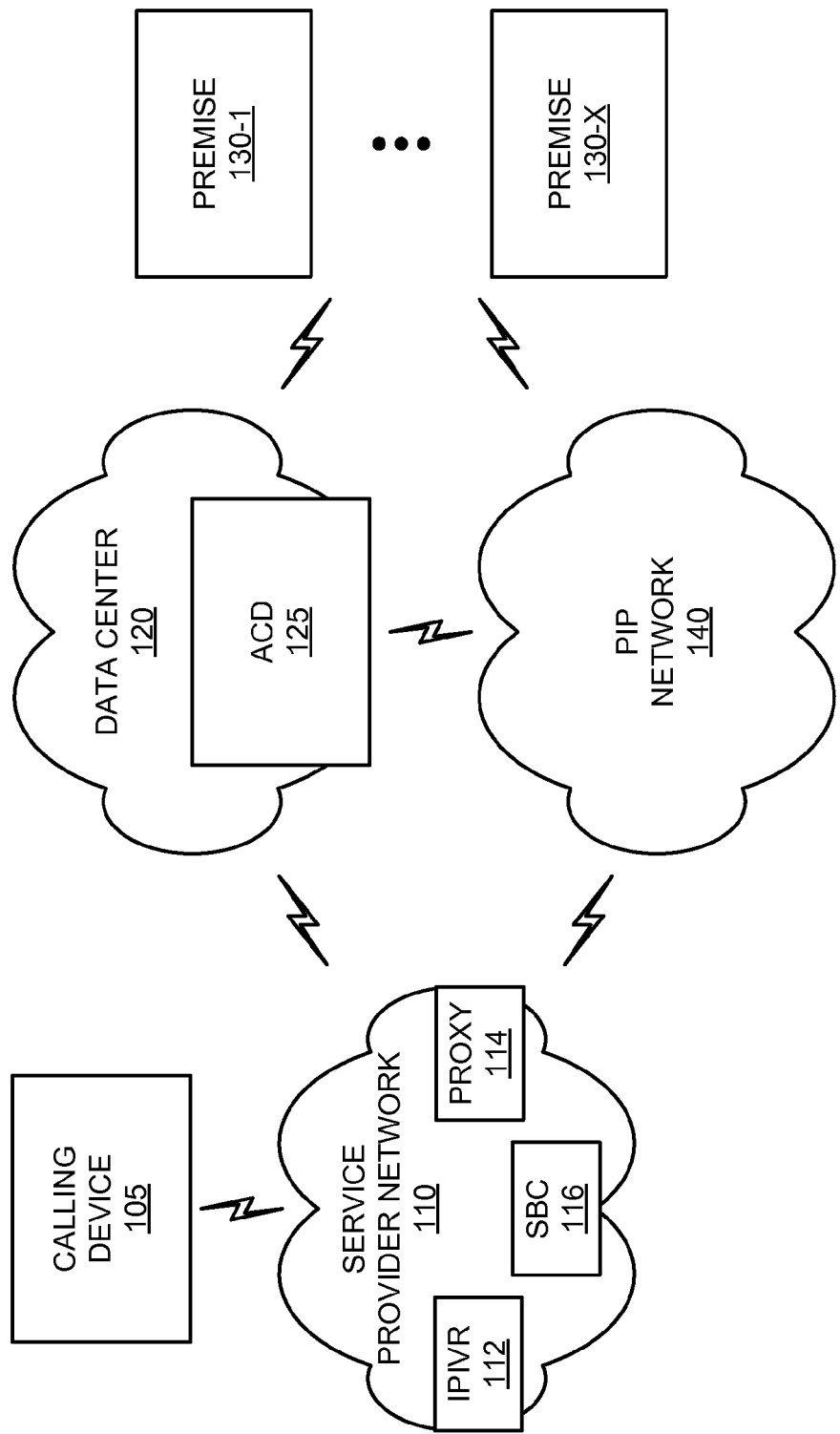
FIG. 1 is a block diagram of an exemplary network environment that enacts third-party call controls using a dedicated duplex communication channel.

The following detailed description refers to the accompanying drawings. The same reference numbers in different drawings may identify the same or similar elements.

Integrating a customer's third-party automatic call distributor (ACD) with a service provider's network-based call routing allows a customer better handling of clients' calls. This integration is sometimes referred to as Intelligent Contact Routing Integration (ICRI). ICRI may allow for a variety of scalable network-based services for handling incoming calls to call centers. A customer may provide service scripts to the service provider network for initially handling calls using automated systems, such as Internet Protocol interactive voice response (IPIVR) systems.

When a caller opts out of an interactive voice response (IVR) menu and elects to speak with an agent, communications between the third-party's ACD and the service provider's IPIVR system are needed to allow the customer to take advantage of call-handling services available from the service provider. For example, the IPIVR system may need to identify availability of a particular agent to handle the call, particular device information for the available agent, and agent supervisor information to support call monitoring functions. However, obtaining such information from the ACD can be inefficient when using hypertext transfer protocol (HTTP) over Transmission Control Protocol (TCP)/IP. Particularly, network address translation (NAT) traversal is problematic with HTTP because of the one-way nature of HTTP. Messages from the service provider's IPIVR system to an ACD, per the service provider network security policy, are typically allowed. But the reverse—messages from outside the service provider network back to the IPIVR system—are typically not allowed by the service provider security policies.

Thus, implementations described herein employ a two-way protocol where the messaging is initiated by the service provider and is allowed by the security policy. The two-way protocol also reduces issues associated with complex routing of commands back to the IPIVR system. For example, commands to the IPIVR system need to route to the correct site, and within the site to the correct redundant IVR hardware component, and within that IVR hardware component to the correct software/firmware instance serving the call.

In one implementation, the devices in the service provider network may use a WebSocket interface with a third-party ACD to initiate communications necessary to support call-handling services. The WebSocket interface provides full-duplex communication channels over a single TCP connection. The WebSocket protocol standards are included, for example, in Internet Engineering Task Force (IETF) as Request for Clarification (RFC) 6455. While use of WebSocket protocol is primarily described herein, any other existing or future protocol that provides full-duplex communication channels over a single TCP connection may also be used according to other implementations.

According to systems and methods described herein, a network device in a service provider network may receive an incoming call, from a caller, to a telephone number associated with a customer (e.g., a company or another entity). The network device may apply to the call an IVR script corresponding to the customer and may determine that the caller wants to speak to an agent. The network device may establish a secure (e.g., encrypted) duplex communication channel between the network device and an ACD for the customer. The secure duplex communication channel may be dedicated for use in managing the incoming call. The network device may inform the ACD, via the secure duplex communication channel, that an agent is needed for the incoming call and receive, via the secure duplex communication channel, instructions from the ACD to manage the incoming call.

In one implementation, the secure duplex communication channel may remain active during the length of the call to allow instructions from the ACD to be communicated before and after the call is connected to an agent. For example, instructions may include instructions to park the call, transfer the call to the agent, transfer the call from one agent to another agent, provide call data to/from the ACD, or set up a conference line for a supervisor.

FIG. 1 is a block diagram showing an exemplary network environment 100 for establishing third-party call control over WebSocket connections. Environment 100 may include a calling device 105, a service provider network 110, a data center 120, multiple premises 130-1 through 130-X (referred to herein collectively as "premises 130" and generically as "premise 130"), and a private IP (PIP) network 140. Service provider network 110 may include an IPIVR system 112, a proxy 114, and a session border controller (SBC) 116. Data center 120 may include an ACD 125.

Calling device 105 may include one or more devices that provide an interface through which a person (e.g., a caller) can communicate with IPIVR system 112 and/or an agent at one of premises 130. Calling device 105 may include a mobile telephone, a wired telephone device, a smart phone, a wearable device (e.g., a smart watch), a personal computer, a laptop computer, a tablet computer, and/or other types of communication devices. Calling device 105 may connect to service provider network 110 via wired and/or wireless connections.

Service provider network 110 may include network devices that provide telecommunications services and provide a backend support system for facilitating call-handling services. Service provider network 110 may include a local area network (LAN), an intranet, a private wide area network (WAN), a telephone network, such as the Public Switched Telephone Network (PSTN), a metropolitan area network (MAN), a public network, a mobile access network, a mesh network, a fiber-optics network (e.g., passive optical networks (PONS)), or a combination of networks. Service provider network 110 may include, for example, one or more private Internet Protocol (IP) networks that use a private IP address space. Although shown as a single element in FIG. 1, service provider network 110 may include a number of separate networks.

Service provider network 110 may receive a call, from calling device 105, to a phone number that is associated with a particular customer (e.g., a particular toll-free number or number with an 8XX area code assigned to the particular customer). Service provider network 110 may route the call to an IPIVR system 112 to apply particular customer scripts and, possibly, transfer the caller to a customer agent.

IPIVR system 112 may include hardware or a combination of hardware and software within service provider network 110. IPIVR system 112 may function as an initial answering point for calls from calling device 105. IPIVR system 112 may answer a call from calling device 105, may play a greeting to calling device 105, and may prompt the user of calling device 105, through played audio messages, to provide information to IPIVR system 112. For example, IPIVR system 112 may prompt the user to provide a reason for the call, to provide information identifying the caller (e.g., an account number, a name, etc.), to provide information identifying an order or subscription associated with the caller, to provide location information associated with the caller, and/or to provide other types of information. IPIVR system 112 may provide the collected information to data center 120 and/or to ACD 125. Based on customer IVR scripts and/or instructions from ACD 125, IPIVR system 112 may route incoming calls to a particular ACD 125 or a particular agent at one of premises 130.

Proxy server 114 may include hardware or a combination of hardware and software within service provider network 110. Proxy server 114 may provide a secure WebSocket interface with ACD 125. According to implementations described herein, IPIVR system 112, using proxy server 114, may initiate a new WebSocket session for every incoming call, from a calling device 105, that requires connection to an agent. Proxy server 114 may relay instructions/data between ACD 125 and IPIVR system 112 (e.g., using the WebSocket interface) to facilitate handling of incoming calls from calling device 105.

SBC 116 may include one or more computation or communication devices for managing signaling and/or media streams. SBC 116 may form a border to and from a service provider network (e.g., service provider network 110). Instructions from IPIVR system 112 and/or other rules may be implemented at SBC 116 to route calls using the general access number (e.g., as dialed by calling device 105) to one of multiple ACDs 125 or premises 130.

Data center 120 may store information about customers associated with ACD 125 and/or agents at premises 130. For example, data center 120 may store account information for customers associated with ACD systems 125. As another example, data center 120 may store agent information for agents at premises 130, such as agent availability, an agent's area of expertise, an agent's supervisor, etc.

ACD 125 may manage a pool of agents at premises 130. For example, ACD 125 may receive a call from calling device 105 and may select an agent from the pool of agents to handle the call. ACD 125 may monitor metrics and availability of agents at premises 130. In one implementation, ACD 125 may include a third-party managed service and/or software for coordinating calls to multiple agents for a single customer. In another implementation, ACD 125 may manage multiple customers with multiple agents.

Premise 130 may include a computing device, workstation, telephone, or another device for an agent/supervisor associated with a customer. Premise 130 may include, for example, a network connection to receive calls transferred to an agent from IPIVR system 112 or ACD 125. Each premise 130 may be associated with a particular agent or supervisor.

PIP network 140 may include a network that uses a private IP address space and which is designed for providing IP communications for customers, such as communications between premises 130 and data center 120 or communications between premises 130 and service provider network 110.

The number of calling devices 105, service provider networks 110, IPIVR systems 112, proxy servers 114, SBCs 116, data centers 120, ACDs 125, premises 130, and PIP networks 140 illustrated in FIG. 1 is provided for simplicity. In practice, there may be more calling devices 105, service provider networks 110, IPIVR systems 112, proxy servers 114, SBCs 116, data centers 120, ACDs 125, premises 130, and PIP networks 140. Moreover, other network devices, such as routers, gateways, switches, etc., may be included within the networks of network environment 100. Thus, in some embodiments, functions of devices in service provider network 110 or data center 120 may be performed by different devices or combinations of devices.

Figure 2:
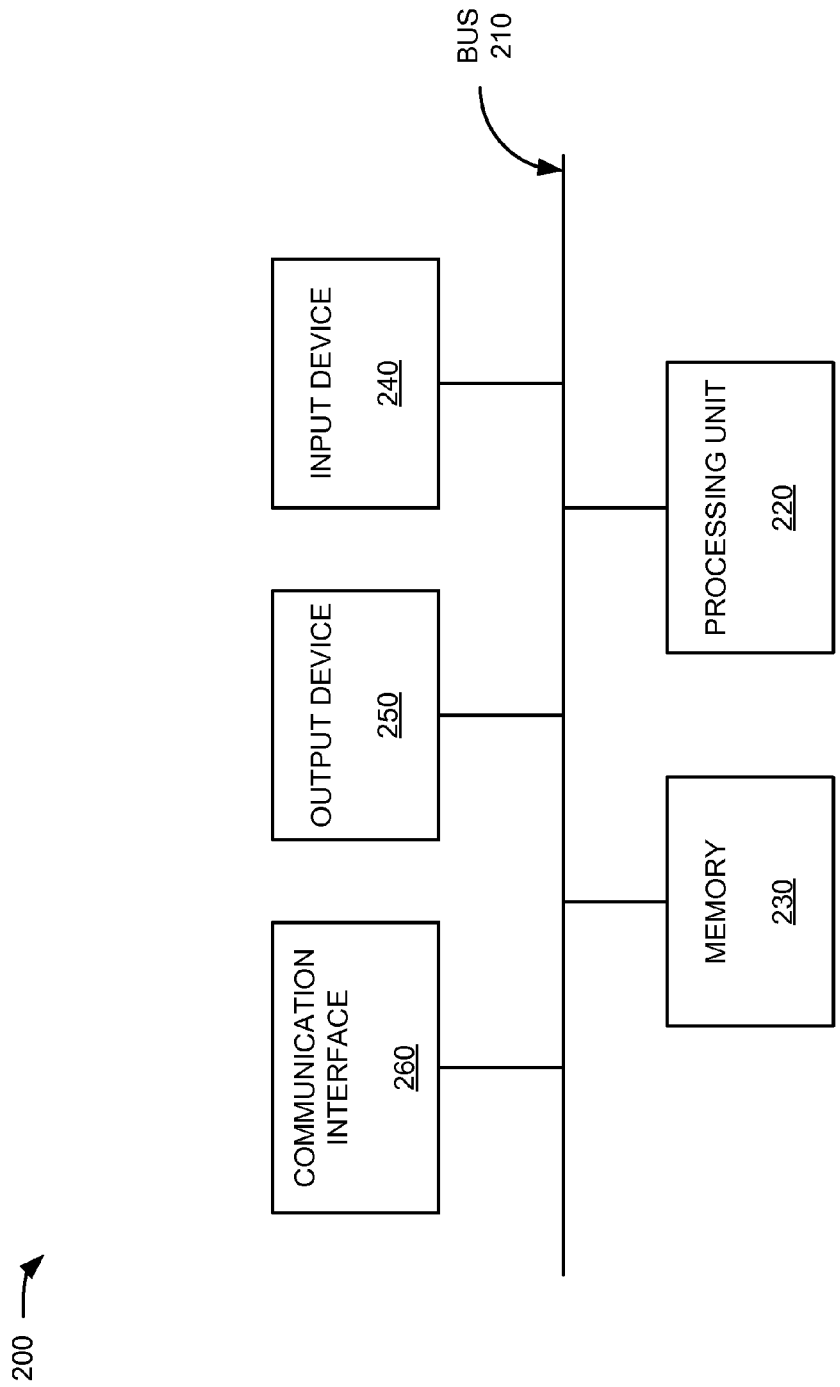
FIG. 2 is a block diagram showing exemplary components of a device according to an implementation.

FIG. 2 is a diagram of exemplary components of a device 200. Device 200 may correspond to calling device 105, IPIVR system 112, proxy server 114, SBC 116, data center 120, or ACD 125. Each of calling device 105, IPIVR system 112, proxy server 114, SBC 116, data center 120, or ACD 125 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver (e.g., a transmitter and/or receiver) that enables device 200 to communicate with other devices and/or systems. For example, communication interface 260 may include mechanisms for communicating with other devices, such as other devices of network 100 or another device 200.

As described herein, device 200 may perform certain operations in response to processing unit 220 executing software instructions contained in a computer-readable medium, such as memory 230. For example, device 200 may perform certain operations relating to executing third-party call control using a WebSocket interface. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software Although FIG. 2 shows exemplary components of device 200, in other implementations, device 200 may include fewer components, different components, additional components, or differently arranged components than depicted in FIG. 2.

Figure 3:
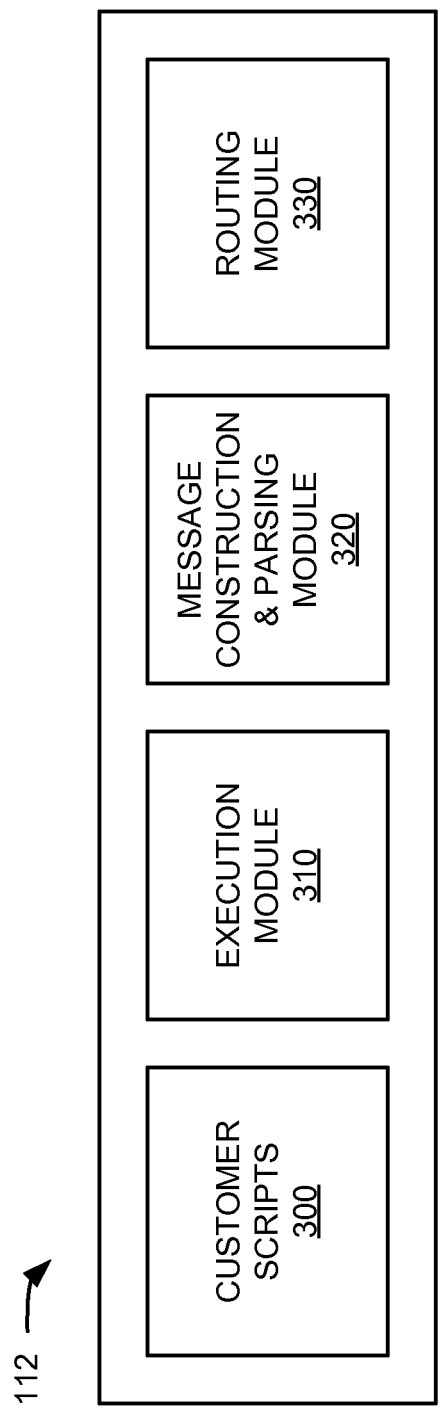
FIG. 3 is a functional block diagram of an exemplary Internet Protocol interactive voice response (IPIVR) system of FIG. 1.

FIG. 3 is a block diagram illustrating exemplary functional components of IPIVR system 112. The functional components of FIG. 3 may be implemented by, for example, processing unit 220 in conjunction with memory 230. As shown in FIG. 3, IPIVR system 112 may include customer scripts 300, an execution module 310, a message construction and parsing module 320, and a routing module 330.

Customer scripts 300 may include individual scripts associated with each customer and/or general number (e.g., a toll-free or 8XX area code number). Customer scripts 300 may include initial IVR menus, interrupt instructions (e.g., for handling a caller's opt-out response or request to connect to an agent), and connection information to establish a secure WebSocket session with the customers ACD.

Execution module 310 may receive instructions from customer scripts 300 and apply input from calling device 105 and/or ACD 125 to execute the instructions. Execution module 310 may assign a unique identifier to a secure WebSocket session for every new call that needs to be transferred to an agent. Execution module 310 may determine when a caller wants to speak with an agent and initiate a WebSocket connection with ACD 125, via proxy server 114. Execution module 310 may also receive and implement call handling instructions (also referred to as call controls) from ACD 125, as described further herein.

Message construction and parsing module 320 may generate queries to ACD 125 (e.g., via proxy server 114) and may receive instructions from ACD 125 (e.g., via proxy server 114). In one implementation, message construction and parsing module 320 may parse/interpret the instructions and may generate messages and parse messages in JavaScript Object Notation (JSON) format. JSON is a text-based, human-readable format for representing simple data structures and associative arrays (also called objects). Other examples of a suitable format for portion messages used to communicate between IPIVR 112 and ACD 125 may include, for example, Extensible Markup Language (XML) files, Hypertext Markup Language (HTML) files, extensible Hypertext Markup Language (XHTML), Advanced Authoring Format (AAF) files, and Resource Description Framework (RDF) files.

Routing module 330 may receive and implement call routing instructions (also referred to as call controls) from ACD 125. For example, routing module 330 may park a call, route a call to an agent designated by ACD 125, transfer a call from one agent to another agent designated by ACD 125, and/or set up a coaching line for a supervisor of an agent. In one implementation, routing module 330 may perform a lookup of an agent or supervisor identifier (e.g., a dynamic access policies (DAP) lookup) to translate the destination label (DL) of an agent from ACD 125 into a session initiation protocol (SIP) uniform resource identifier (URI) for the selected premise 130 of the agent.

Figure 4:
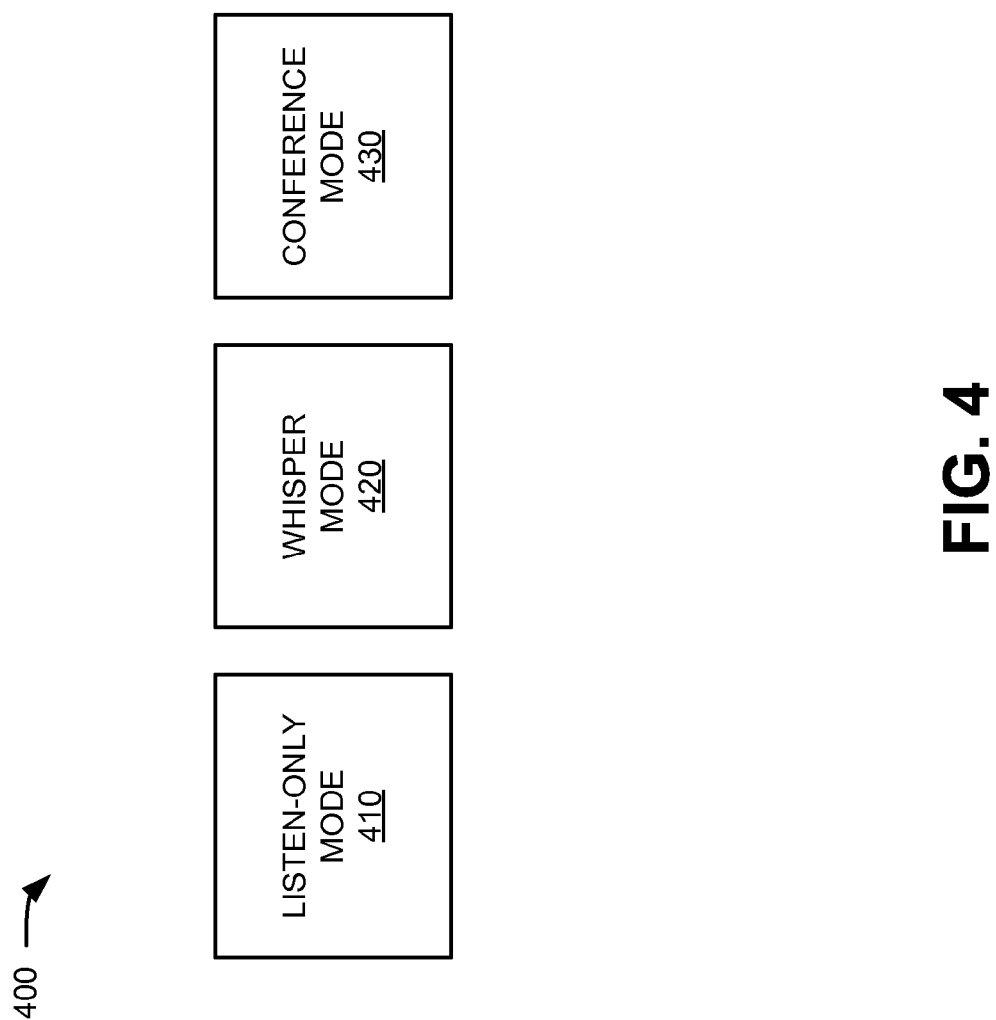
FIG. 4 is a diagram illustrating exemplary supervisor modes that may be supported by the exemplary IPIVR system of FIG. 1.

FIG. 4 is a block diagram illustrating exemplary supervisor modes 400 that may be supported by IPIVR system 112. As shown in FIG. 4, supervisor modes 400 may include a listen-only mode 410, a whisper mode 420, and a conference mode 430. As described further herein, one of supervisor modes 400 may be selected by a supervisor to monitor an agent. One of supervisor modes 400 may be indicated as a parameter, when a supervisor elects to add a coaching line for an agent that is conducting a call with a caller. Supervisor modes 400 may be implemented, for example, by routing module 330.

Listen-only mode 410 allows a supervisor to hear the caller and the agent. The caller and agent would not be able to hear the supervisor. Whisper mode 420 allows the supervisor to hear the caller and the agent. The agent hears the caller and the supervisor, and the caller only hears the agent. Whisper mode may allow the supervisor to advise the agent while not being heard by the caller. If there are two agents assisting a caller, the supervisor can talk to both agents at once. In one implementation, the supervisor may not be able to talk to one agent without the other hearing. Conference mode 430 allows all parties to speak to and hear all other parties.

Figure 5:
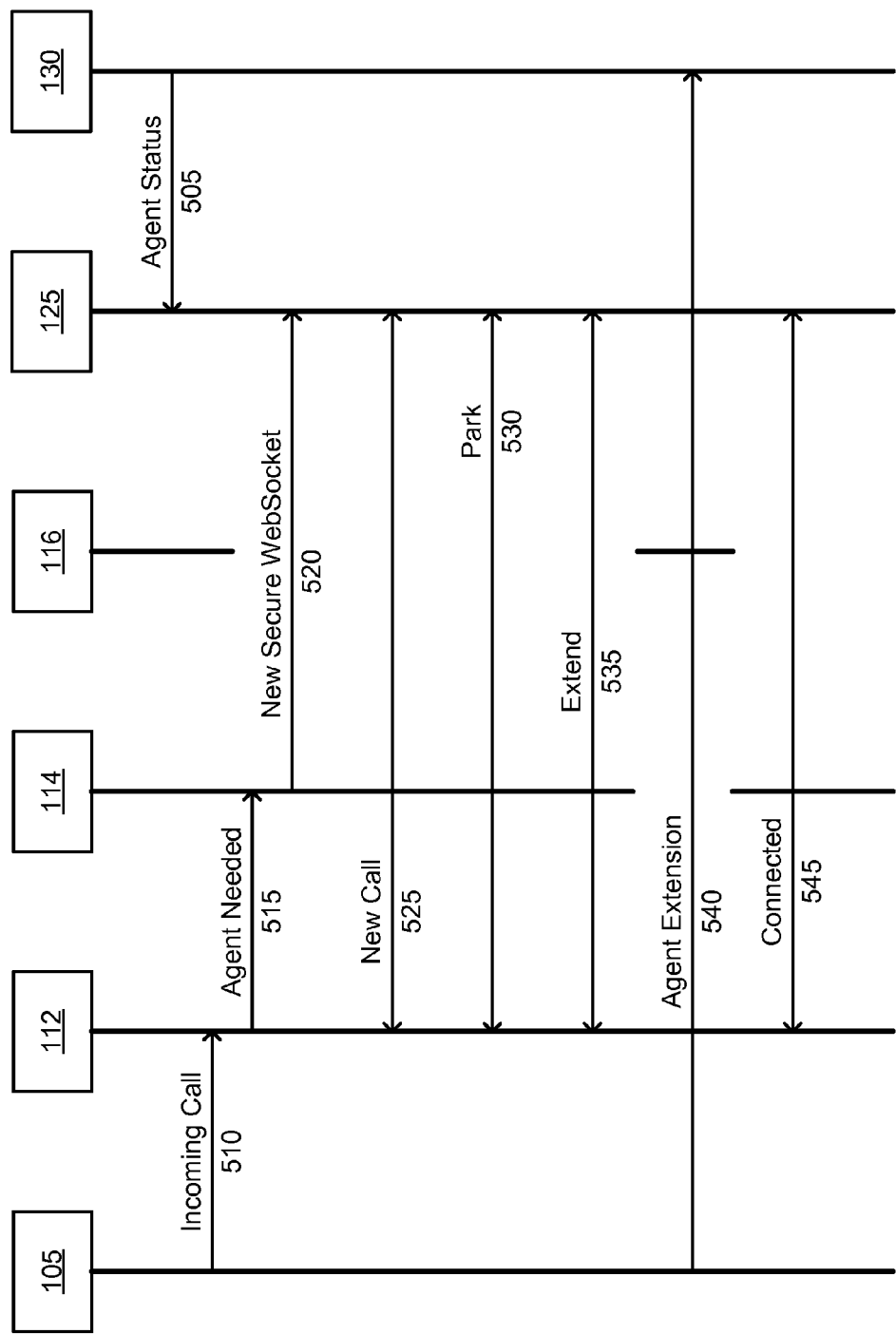
FIG. 5 is a diagram of exemplary communications among devices in a portion of the network environment of FIG. 1.

FIG. 5 is a diagram of exemplary communications among devices in a portion 500 of network environment 100. Communications in FIG. 5 may represent communications for enacting third-party call controls using a dedicated duplex communication channel. As shown in FIG. 5, network portion 500 may include calling device 105, IPIVR system 112, proxy server 114, SBC 116, ACD 125, and premise 130. Calling device 105, IPIVR system 112, proxy server 114, SBC 116, ACD 125, and premise 130 may include features described above in connection with FIGS. 1-4.

As shown in FIG. 5, premise 130 may provide an agent status 505 to ACD 125. Agent status 505 may reflect, for example, an agent's presence at a workstation, an agent's availability to receive incoming calls, etc. Agent status 505 may be updated periodically or in real time (e.g., in response to actions by the agent at premise 130).

An incoming call 510 may be initiated by calling device 105 and received by IPIVR system 112. Incoming call 510 may be a call to a general number (e.g., a toll-free or 8XX area code number) for services associated with a customer. IPIVR system 112 may apply initial IVR scripts for the customer. Assuming the customer reaches a point in the script where connection to an agent is requested, IPIVR system 112 may provide an agent needed indication 515 to proxy server 114. In response to agent needed indication 515, proxy server 114 may establish a dedicated, secure full-duplex communication channel 520 (e.g., a WebSocket) with ACD 125. For example, proxy server 114 may initiate an HTTP connection with ACD 125 that switches to WebSocket protocol during a WebSocket handshake.

Duplex communication channel 520 may be dedicated to the particular incoming call 510. Thus, second incoming call (not shown) to a different telephone number associated with the same customer (or a different customer) would cause IPIVR system 112 to establish another new secure duplex communication channel that is dedicated for use in managing the other incoming call, when an agent is requested. Similarly, a third incoming call (not shown) to the same telephone number associated with the customer (and using the same IVR script as the original caller) would cause IPIVR system 112 to establish a different secure duplex communication channel that is dedicated for use in managing the third incoming call, when an agent is requested.

Figure 6A:
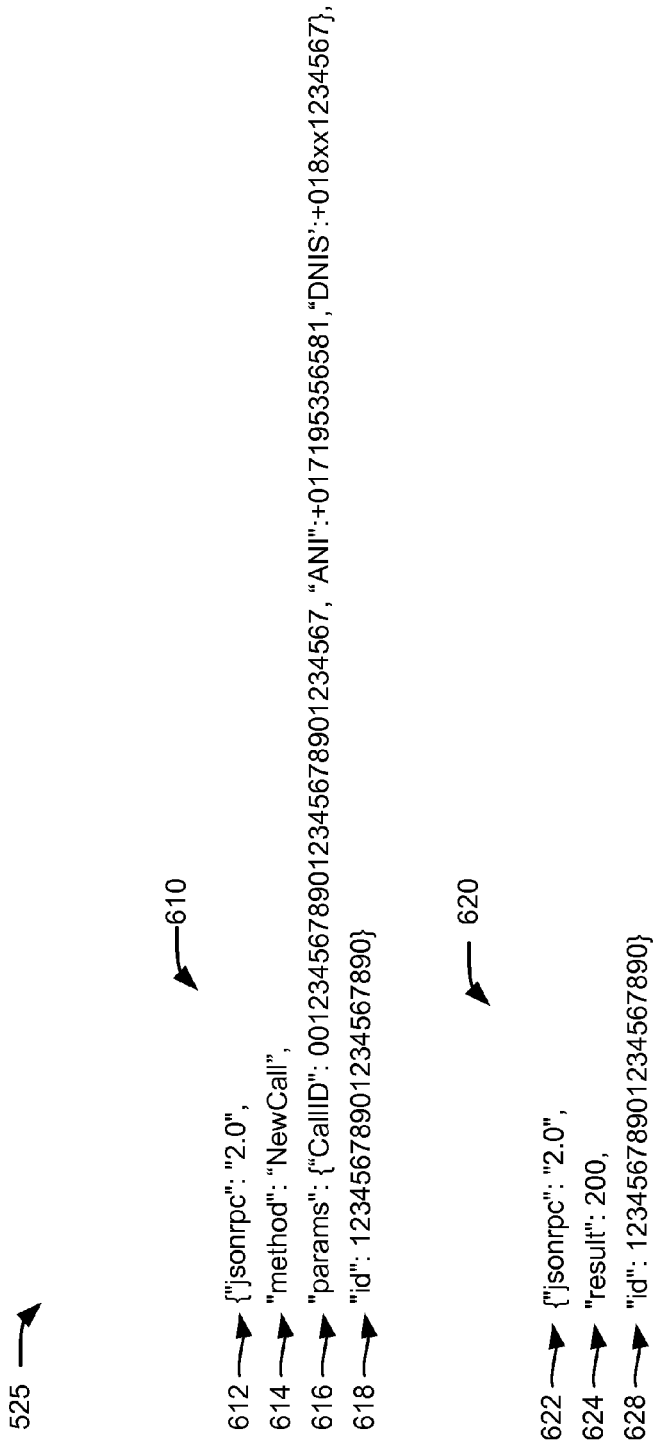
FIG. 6A-6D are examples of commands for performing some of the exemplary communications of FIG. 5.

Using duplex communication channel 520, IPIVR system 112 may perform a new call exchange 525. Using new call exchange 525, IPIVR system 112 may provide a unique call identifier (e.g., a unique alpha-numeric code generated by IPIVR system 112) associated with the call from calling device 105. ACD 125 may receive the unique call identifier and may respond with a confirmation. In one implementation, new call exchange 525 may use a JSON remote procedure call (RPC) format. FIG. 6A provides an example of communications for new call exchange 525.

Referring to FIG. 6A, new call exchange 525 may include a request object 610 generated by IPIVR system 112 and a response object 620 generated by ACD 125. Request object 610 may include protocol field 612 to identity a protocol and version (e.g., JSON-RPC version 2.0) and a method field 614 to identify the name of a method to be invoked by ACD 125 (e.g., "NewCall"). Request object 610 may also include a parameters field 616 to identify parameters to be used for the "NewCall" method and an object identifier field 618. Parameters in parameters field 616 may include, for example, the unique call identifier (e.g., "CallID") assigned for the call; a number associated with calling device 105, such as the automatic number identification ("ANI") number of calling device 105; and the number dialed by the calling device, such as the Dialed Number Identification Service ("DNIS") number dialed detected for calling device 105. Object identifier field 618 may include an identifier, for the particular request object 610, established by IPIVR system 112 or proxy server 114. Thus, request object 610 may provide to ACD 125 the identity of the calling device 105, the number called by calling device 105, and a unique identifier for the call. In another implementation, other parameters may also be included in request object 610, such as parameters with information obtained through IVR inputs from calling device 105.

Response object 620 may include protocol field 612 to identity a protocol and version (e.g., JSON-RPC version 2.0), a result field 624 to indicate success or error code pertaining to request object 610 (e.g., "200", OK, etc.), and an object identifier field 628 to associate response object 620 with request object 610. The value in object identifier field 628 and object identifier field 618 must be the same for response object 620 to be accepted. Thus, response object 620 may provide to IPIVR system 112 confirmation that the unique call identifier has been assigned for the new call from calling device 105 (e.g., incoming call 510).

Figure 6B:
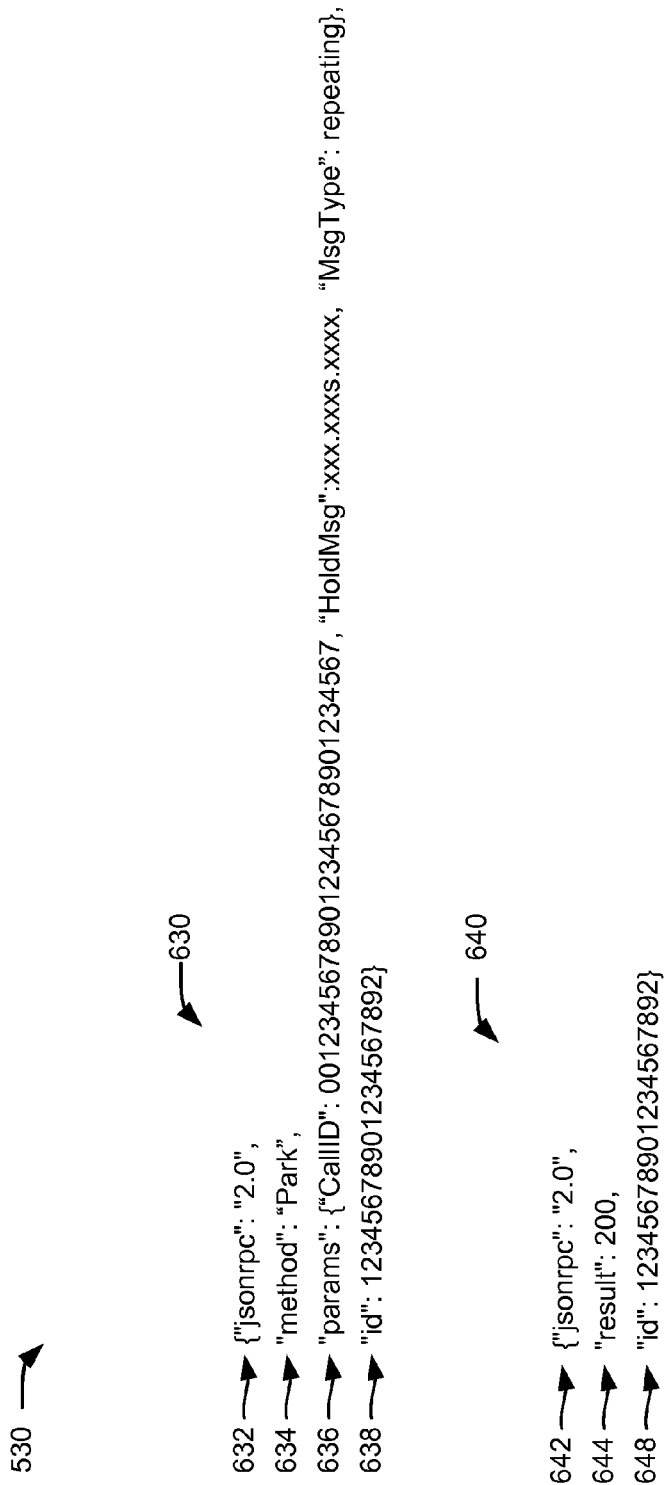

Returning to FIG. 5, ACD 125 may use information from agent status 505 to determine a command for IPIVR system 112 to handle incoming call 510. For example, if no agents (e.g., at premises 130) associated with the customer are available, ACD 125 may direct IPIVR system 112 to park incoming call 510 until an agent is available. For example, using duplex communication channel 520, ACD 125 may initiate a park exchange 530 with IPIVR system 112. In one implementation, park exchange 530 may again use JSON-RPC format. FIG. 6B provides an example of communications for park exchange 530.

Referring to FIG. 6B, park exchange 530 may include a request object 630 generated by ACD 125 and a response object 640 generated by IPIVR system 112. Request object 630 may include protocol field 632 to identity a protocol and version (e.g., JSON-RPC version 2.0) and a method field 634 to identify the name of a method to be invoked by IPIVR system 112 (e.g., "Park"). Request object 630 may also include a parameters field 636 to identify parameters to be used for the "Park" method and an object identifier field 638. Parameters in parameters field 636 may include, for example, the same unique call identifier (e.g., "CallID") assigned for the call in request object 610; a message content identifier (e.g., "HoldMsg") to identify a particular recorded text, music, etc. to announce to the caller on calling device 105; and a message type identifier (e.g., "MsgType") to identify, for example, how the hold message presented, such as once time or recurring. Thus, request object 630 may provide to IPIVR system 112 instructions to park incoming call 510 and provide particular information (e.g., a hold message, music, etc.). In another implementation, other parameters may also be included in request object 630, such as more detailed instructions for presenting hold messages.

Response object 640 may include protocol field 642 to identity a protocol and version (e.g., JSON-RPC version 2.0), a result field 644 to indicate success or error code pertaining to request object 630 (e.g., "200", OK, etc.), and an object identifier field 648 to associate response object 640 with request object 630. Again, the value in object identifier field 648 and object identifier field 638 must be the same for response object 640 to be accepted. Thus, response object 640 may provide to ACD 125 confirmation that the park instructions have been received for incoming call 510.

Figure 6C:

Returning to FIG. 5, ACD 125 may use information from agent status 505 to determine that an agent is now available to take incoming call 510 (that was parked as a result of park exchange 530). Using duplex communication channel 520, ACD 125 may initiate an extend exchange 535 with IPIVR system 112. Extend exchange 535 may provide instructions for IPIVR system 112 to route incoming call 510 to the available agent at a particular premise 130. In one implementation, extend exchange 535 may again use JSON-RPC format. FIG. 6C provides an example of communications for extend exchange 535.

Referring to FIG. 6C, extend exchange 535 may include a request object 650 generated by ACD 125 and a response object 660 generated by IPIVR system 112. Request object 650 may include protocol field 652 to identity a protocol and version (e.g., JSON-RPC version 2.0) and a method field 654 to identify the name of a method to be invoked by IPIVR system 112 (e.g., "Extend"). Request object 650 may also include a parameters field 656 to identify parameters to be used for the "Extend" method and an object identifier field 658. Parameters in parameters field 656 may include, for example, the same unique call identifier (e.g., "CallID") assigned for the call in request object 610 and various parameters for enabling transferring of incoming call 510 to an agent at premise 130. Parameters for transferring may include, for example, toll-free designations, NCR (Network Call Redirect) parameters to remove defined Terminating Routes, disabling BRNA (busy/ring no answer) features, a destination label (DL) for the agent at premise 130, etc. Thus, request object 650 may provide to IPIVR system 112 instructions to route incoming call 510 to a particular agent at a premise 130.

Response object 660 may include protocol field 662 to identity a protocol and version (e.g., JSON-RPC version 2.0), a result field 664 to indicate status code (e.g., "100", trying, etc.) pertaining to request object 650, and an object identifier field 668 to associate response object 660 with request object 650. Again, the value in object identifier field 668 and object identifier field 658 must be the same for response object 660 to be accepted. Thus, response object 660 may provide to ACD 125 confirmation that IPIVR system 112 has received request object 650 and is attempting to execute the request.

Figure 6D:
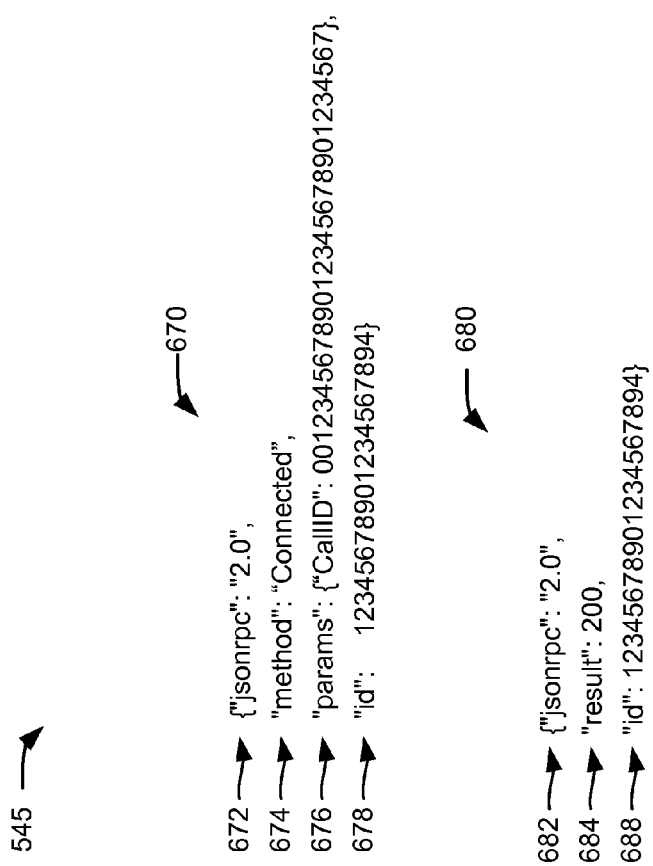

Returning again to FIG. 5, in response to extend exchange 535, IPIVR system 112 may execute the extension method (e.g., from request object 650) as requested by ACD 125. In one implementation, the termination of incoming call 510 may resolve to an IP termination. IPIVR system 112 may perform a data access point (DAP) or service control point (SCP) lookup (not shown) to translate the destination label (DL) of the agent (e.g., from request object 650) to a SIP URI for the designated route point. IPIVR system 112 may then perform a call extension and bridge the inbound leg of incoming call 510 to the agent at premise 130. Thus, as shown in agent extension 540, the IP termination is successful to connect calling device 105 with the agent at premise 130. As further shown in FIG. 5, IPIVR system 112 may use duplex communication channel 520 to perform a connected confirmation exchange 545. Connected confirmation exchange 545 may provide confirmation for ACD 125 that calling device 105 has been connected to the particular available agent at premise 130. In one implementation, connected confirmation exchange 545 may again use JSON-RPC format. FIG. 6D provides an example of communications for extend exchange 535.

Referring to FIG. 6D, connected confirmation exchange 545 may include a request object 670 generated by IPIVR system 112 and a response object 680 generated by ACD 125. Request object 670 may include protocol field 672 to identity a protocol and version (e.g., JSON-RPC version 2.0) and a method field 674 to identify the name of a method to be invoked by ACD 125 (e.g., "Connected"). Request object 670 may also include a parameters field 676 to identify parameters to be used for the "Connected" method and an object identifier field 678. Parameters in parameters field 676 may include, for example, the same unique call identifier (e.g., "CallID") assigned for the call in request object 610. Object identifier field 678 may include an identifier, for the particular request object 670. Thus, request object 670 may provide to ACD 125 a confirmation that calling device 105 is connected to the particular agent at premise 130 that was identified in request object 650. In another implementation, other parameters may also be included in request object 670, such as connection times or other data that may be associated with the connection of calling device 105 with the agent.

Response object 680 may include protocol field 682 to identity a protocol and version (e.g., JSON-RPC version 2.0), a result field 684 to indicate success or error code (e.g., "200", OK, etc.), and an object identifier field 688 to associate response object 680 with request object 670. The value in object identifier field 688 and object identifier field 678 must be the same for response object 680 to be accepted. Thus, response object 680 may allow ADC 125 to acknowledge the transfer of the incoming call from calling device 105 (e.g., incoming call 510) to the particular agent at premise 130.

Although FIGS. 5-6D show exemplary communications of network portion 500, in other implementations, different communications may be used than those depicted in FIG. 5-6D to enact third-party call control over web sockets. Additionally, the communications explained and illustrated in FIG. 5 are exemplary and do not represent each and every message that may be exchanged. For example, various initiation and acknowledgement messages may be used where a single communication event is shown.

While FIG. 5 describes park and extend call controls that may be implemented according to implementations described herein, other third-party call controls may be accomplished using the dedicated duplex communication channel 520. For example, ACD 125 may use duplex communication channel 520 to submit a transfer request object. The transfer request object may instruct IPIVR system 112 to call another agent and transfer the caller to the other agent. The transfer request object may be provided via a JSON-RPC exchange similar to the request object and response object used in extend exchange 535, for example.

In another implementation, ACD 125 may also use duplex communication channel 520 to submit a collection request object to instruct IPIVR system 112 to collect information relating to an incoming call. The collection request may include a dual-tone multi-frequency signaling (DTMF) collection request or a more complex interaction specified, for example, in a VoiceXML document.

In still another implementation, ACD 125 may use duplex communication channel 520 to submit a data message object to IPIVR system 112. The data message may be used to transfer data to IPIVR system 112. This data may be used for subsequent IVR interactions, such as lookups, or may be transferred by IPIVR system 112 to a subsequent agent.

In still other implementations, IPIVR system 112 may use duplex communication channel 520 to submit a data message object to ACD 125. The data message from IPIVR system 112 may include, for example, data collected from caller interactions.

Figure 7:
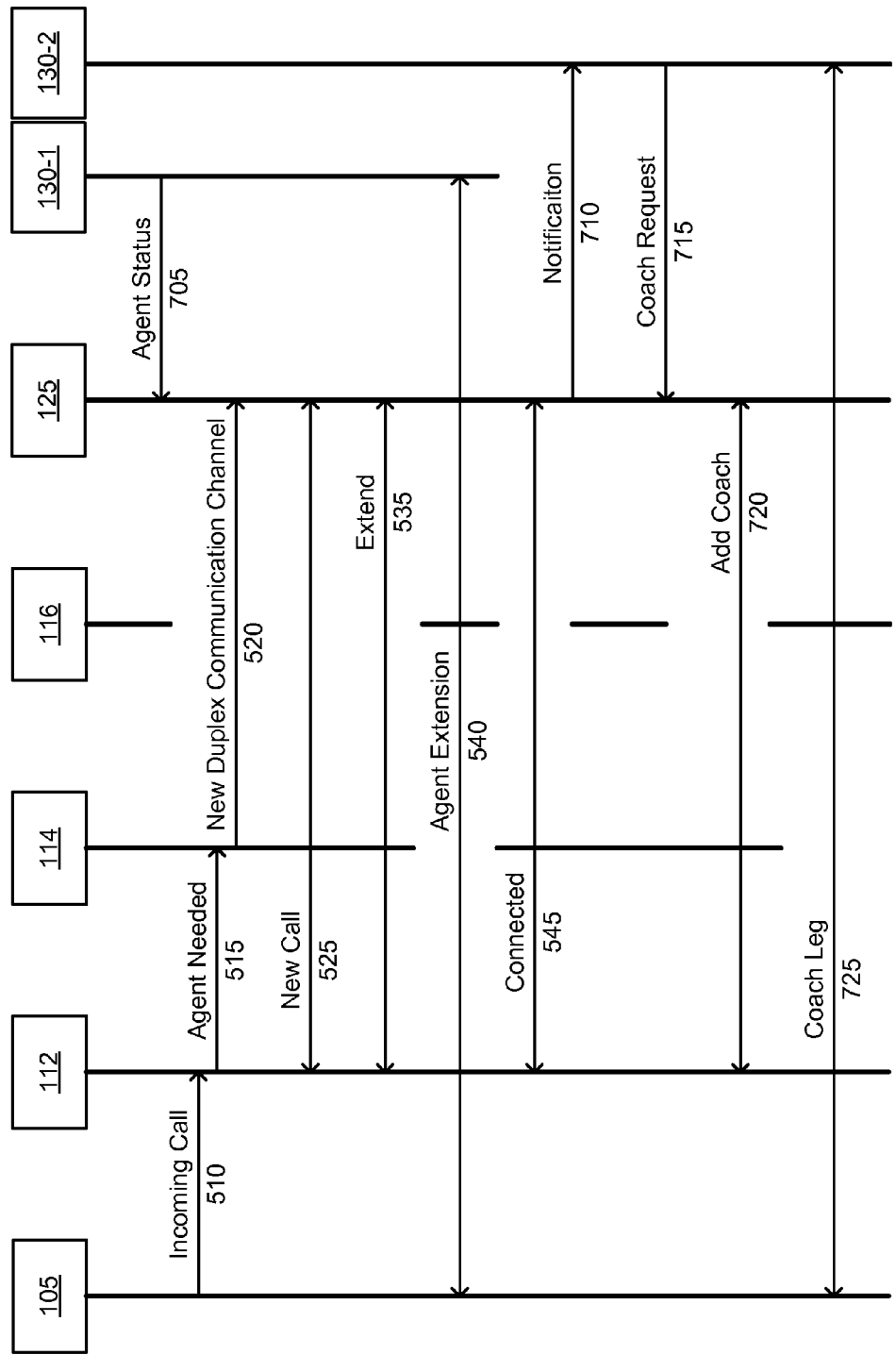
FIG. 7 is a diagram of additional exemplary communications among devices in a portion of the network environment of FIG. 1.

FIG. 7 is a diagram of exemplary communications among devices in another portion 700 of network environment 100. Communications in FIG. 7 may represent communications for enacting supervisor monitoring options using a dedicated duplex communication channel. As shown in FIG. 7, network portion 700 may include calling device 105, IPIVR system 112, proxy server 114, SBC 116, ACD 125, an agent premise 130-1, and a supervisor premise 130-2. Calling device 105, IPIVR system 112, proxy server 114, SBC 116, ACD 125, and premises 130 may include features described above in connection with FIGS. 1-5.

As shown in FIG. 7, agent premise 130-1 may provide an agent status 705 to ACD 125. Agent status 705 may reflect, for example, an agent's presence at a workstation, an agent's availability to receive incoming calls, etc. Agent status 705 may be updated periodically or in real time (e.g., in response to actions by the agent at premise 130).

Similar to communications 510, 515, 520, 525, 535, and 540 shown in FIG. 5 and described above, in FIG. 7, IPIVR system 112 may receive incoming call 510, indicate that an agent is needed 515, establish a secure duplex communication channel 520, perform a new call exchange 525 to provide a unique call identifier, perform an extend exchange 535 to provide instructions for IPIVR system 112 to route the incoming call to an available agent, extend the call 540 to the particular agent (e.g., at agent premise 130-1), and perform a connected confirmation exchange 545.

About the same time incoming call 510 is delivered to agent premise 130-1, a supervisor at supervisor premise 130-2, who may be subscribed to the status of one or more agents, receives a notification 710 from ACD 125 that the agent has received a call. Assume the supervisor elects to coach the agent through the call. The supervisor may send a coach request 715 to ACD 125 via a supervisor interface at supervisor premise 130-2. Coach request 715 may include, for example, a supervisor ID and an agent ID (e.g., a unique identifier of the agent at agent premise 130-1). ACD 125, having previously associated the agent with the particular secure duplex communication channel 520 (e.g., via extend exchange 535), may associate coach request 715 with the corresponding secure duplex communication channel 520.

Using duplex communication channel 520, ACD 125 may initiate an add coach exchange 720 with IPIVR system 112. In one implementation, add coach exchange 720 may use JSON-RPC format. Similar to extend exchange 535 described above, add coach exchange 720 may include an add-coach object (e.g., similar to request object 650) generated by ACD 125 to identify addition of a coaching line for a specified supervisor ID. The add-coach object may include parameters indicating, among other parameters, the supervisor DL, the agent, and a mode for the coaching line (e.g., listen only, whisper, or conference). Add coach exchange 720 may also include a response object (e.g., similar to response object 660) generated by IPIVR system 112.

In response to add coach exchange 720, IPIVR system 112 may execute instructions to add a coaching line for the supervisor. In one implementation, IPIVR system 112 may perform a data access point (DAP) lookup (not shown) to translate the destination label (DL) of the supervisor (e.g., from the add-coach object) to a SIP URI for the designated route point. IPIVR system 112 may then outdial the supervisor premise 130-2. When the supervisor answers the outdialed call, IPIVR system 112 puts the supervisor in a coaching conference with the caller of calling device 105 and the agent of agent premise 130-1. Thus, as shown in coach leg 725, the supervisor at supervisor premise 130-2 may successfully join the existing call (e.g., in one of a listen only, whisper, or conference mode) between calling device 105 and agent premise 130-1. According to another implementation, IPIVR system 112 may follow the successful completion of coach leg 725 with a confirmation to ACD 125, similar to connected confirmation exchange 545.

Figure 8:
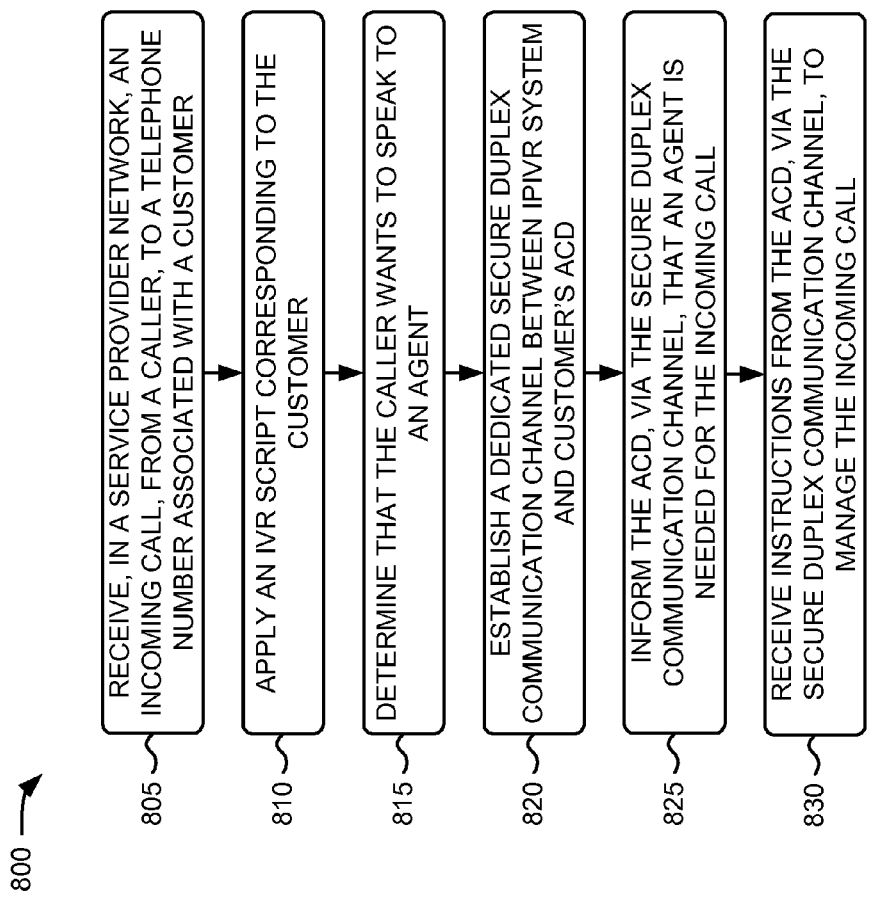
FIGS. 8 and 9 are flow diagrams illustrating an exemplary process for enacting third-party call controls using a dedicated duplex communication channel, according to an implementation described herein.

FIG. 8 is a flow diagram illustrating an exemplary process 800 for enacting third-party call controls using a dedicated duplex communication channel according to an implementation described herein. In one implementation, process 800 may be performed by IPIVR system 112. In another implementation, some or all of process 800 may be performed by service provider IPIVR system 112 in conjunction with another device or group of devices, such as ACD 125.

As shown in FIG. 8, process 800 may include receiving, in a service provider network, an incoming call, from a caller, to a telephone number associated with a customer (block 805), and applying an interactive voice response (IVR) script corresponding to the customer (block 810). For example, as shown in FIG. 5, IPIVR system 112 may receive an incoming call 510 on a particular toll-free access number for a customer. IPIVR system 112 may apply an IVR script associated with the access number to engage the caller.

Process 800 may also include determining that the caller wants to speak to an agent (block 815), and establishing a dedicated, secure duplex communication channel between the network device and an ACD for the customer (block 820). For example, as shown in FIG. 5, IPIVR system 112 may detect that the caller wants to speak with an agent. IPIVR system 112 may initiate a new secure duplex communication channel 520 that is dedicated for incoming call 510. IPIVR system 112 may assign a unique identifier for duplex communication channel 520 and may associate the incoming call with the unique identifier.

Process 800 may further include informing the ACD, via the secure duplex communication channel, that an agent is needed for the incoming call (block 825), and receiving instructions from the ACD, via the secure duplex communication channel, to manage the incoming call (block 830). For example, IPIVR system 112 may initiate new call exchange 525 over duplex communication channel 520 with a request object 610 generated by IPIVR system 112 and a response object 620 generated by ACD 125. New call exchange 525 may indicate an agent is needed and associate incoming call 510 with duplex communication channel 520. In response to new call exchange 525, ACD 125 may provide instructions for handling the call.

Figure 9:
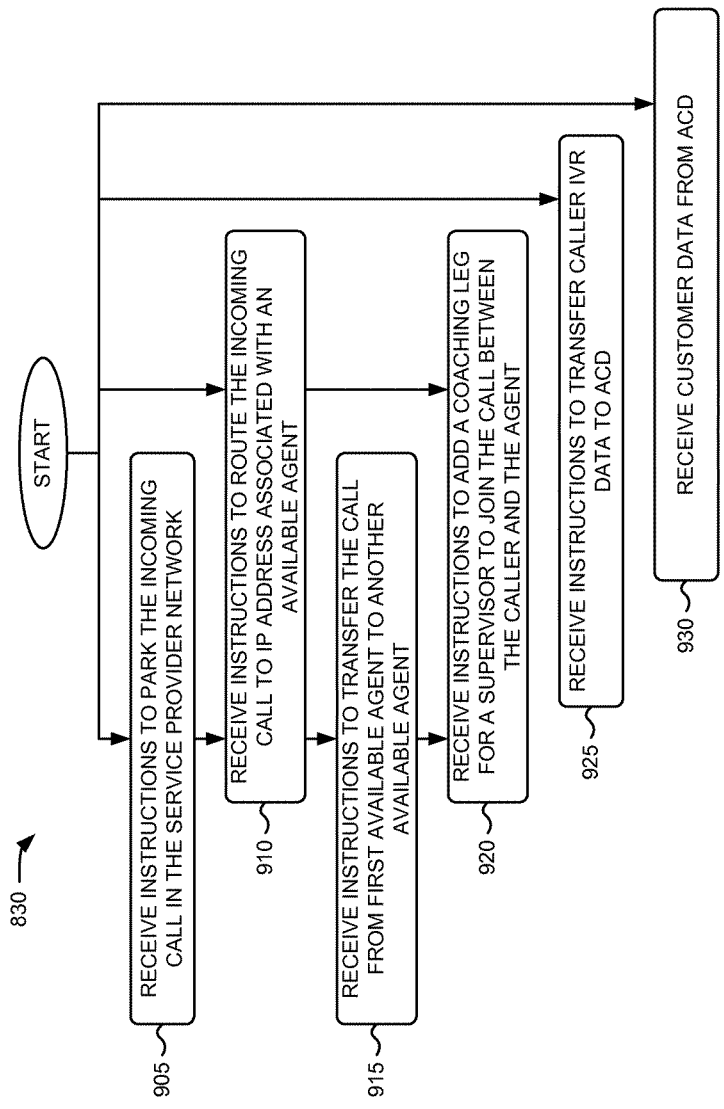

Process block 830 may include the process blocks depicted in FIG. 9. As shown in FIG. 9, process block 830 may include receiving instructions to park the incoming call in the service provider network (block 905), and receiving instructions to route the incoming call to IP address associated with an available agent (block 910). For example, IPIVR system 112 may receive from ACD 125, via duplex communication channel 520, request object 630 to park the call or request object 650 to extend the call to an agent at premise 130.

Additionally, process block 830 may include receiving instructions to transfer the call from a first available agent to another available agent (block 915), and/or receiving instructions to add a coaching leg for a supervisor to join the call between the caller and the agent (block 920). For example, IPIVR system 112 may receive from ACD 125, via duplex communication channel 520, a transfer request object to instruct IPIVR system 112 to call another agent and transfer the caller to the other agent. Additionally, or alternatively, IPIVR system 112 may receive from ACD 125, via duplex communication channel 520, an add-coach object to identify addition of a coaching line for a specified supervisor ID and agent.

Process block 830 may additionally or alternatively include receiving instructions to transfer caller IVR data to the ACD (block 925) and receiving customer data from the ACD (block 930). For example, ACD 125 may use duplex communication channel 520 to provide instructions for IPIVR system 112 to collect and transfer data from one or more caller IVR sessions. Conversely, ACD 125 may use duplex communication channel 520 to provide IPIVR system 112 with data (e.g., for future IVR sessions).

In addition to facilitating communications between IPIVR system 112 and ACD 125, duplex communication channel 520 may facilitate movement of telephony features that are typically located at the premise (e.g., premise 130) such as quality monitoring solution (e.g., recording) and real-time monitoring (e.g., supervising/coaching) to the provider network (e.g., service provider network 110). Movement of feature delivery from premises 130 to service provider network 110 can provide substantial advantages, such as efficiency, reduction of equipment, and cost/pricing advantages. Use of a control channel, such as duplex communication channel 520 described herein, can enable these network-based features.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8 and 9, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a network device in a service provider network, an incoming call, from a caller, to a telephone number associated with a customer;
   applying, by the network device, an interactive voice response (IVR) script corresponding to the customer;
   determining, by the network device, that the caller wants to speak to an agent;
   establishing a secure duplex communication channel between the network device and an automatic call distributor (ACD) for the customer, the ACD being outside the service provider network, wherein the secure duplex communication channel is dedicated for use in managing the incoming call;
   informing, by the network device via the secure duplex communication channel, the ACD that an agent is needed for the incoming call; and
   receiving, by the network device via the secure duplex communication channel, instructions from the ACD to manage the incoming call.

2. The method of claim 1, further comprising:
   receiving, by the network device, another incoming call, from another caller, to the telephone number associated with the customer; and
   establishing, with the ACD for the customer, another secure duplex communication channel that is dedicated for use in managing the other incoming call.

3. The method of claim 1, the secure duplex communication channel including a single Transmission Control Protocol (TCP) connection.

4. The method of claim 1, further comprising:
   associating, by the network device, the incoming call with a unique identifier for the secure duplex communication channel.

5. The method of claim 1, further comprising:
   receiving, by the network device, another incoming call, from another caller, to a different telephone number associated with another customer;
   applying, by the network device, an interactive voice response (IVR) script corresponding to the other customer; and
   establishing, with an ACD for the other customer, another secure duplex communication channel that is dedicated for use in managing the other incoming call.

6. The method of claim 1, wherein receiving the instructions to manage the incoming call comprises at least one of:
   receiving a JavaScript Object Notation (JSON) object,
   receiving an Extensible Markup Language (XML) file,
   receiving a Hypertext Markup Language (HTML) file,
   receiving an extensible Hypertext Markup Language (XHTML) file,
   receiving an Advanced Authoring Format (AAF) file, and
   receiving a Resource Description Framework (RDF) file.

7. The method of claim 1, wherein receiving the instructions to manage the incoming call comprises at least one of:
   receiving instructions to park the incoming call in the service provider network; and
   receiving instructions to route the incoming call to an internet protocol (IP) address associated with an available agent.

8. The method of claim 1, further comprising:
   routing the incoming call to a first available agent; and
   receiving, via the secure duplex communication channel, instructions to transfer the incoming call from the first available agent to another available agent.

9. The method of claim 1, further comprising:
   routing the incoming call to connect the caller to the agent;
   receiving, via the secure duplex communication channel, instructions to add a coaching leg for a supervisor to join the call between the caller and the agent; and
   adding a leg for the supervisor to join the call with the caller and the agent.

10. The method of claim 9, wherein the leg for the supervisor includes a mode selected from the group of:
    a listen only mode that allows neither the caller or the agent to hear the supervisor,
    a whisper mode that allows the agent to hear the caller and the supervisor and allows the caller to hear only the agent, and a conference mode that allows the caller, the agent, and the supervisor to hear each other.

11. The method of claim 1, wherein the secure duplex communication channel uses WebSocket protocols.

12. A system, comprising:
one or more memories to store instructions; and
one or more processors to execute the instructions in the one or more memories to:
receive, in a service provider network, an incoming call, from a caller, to a telephone number associated with a customer;
apply an interactive voice response (IVR) script corresponding to the customer;
determine that the caller wants to speak to an agent;
establish, with an automatic call distributor (ACD) for the customer, a secure duplex communication channel that is dedicated for use in managing the incoming call, the ACD being outside the service provider network;
inform, via the secure duplex communication channel, the ACD that an agent is needed for the incoming call; and
receive, via the secure duplex communication channel, instructions from the ACD to manage the incoming call.

13. The system of claim 12, wherein the instructions to manage the incoming call comprise a JavaScript Object Notation (JSON) object.

14. The system of claim 12, wherein the secure duplex communication channel includes a single Transmission Control Protocol (TCP) connection.

15. The system of claim 12, wherein the one or more processors are further to execute the instructions in the one or more memories to:
assign a unique identifier for the secure duplex communication channel; and
associate the incoming call with the unique identifier for the secure duplex communication channel.

16. The system of claim 12, wherein the instructions to manage the incoming call comprise instructions to route the incoming call to an internet protocol (IP) address associated with an available agent.

17. The system of claim 12, wherein the instructions to manage the incoming call comprise instructions to add a coaching leg for a supervisor to join the call between the caller and the agent.

18. A non-transitory computer-readable medium storing instructions executable by a computational device to:
receive, in a service provider network, an incoming call, from a caller, to a telephone number associated with a customer;
apply an interactive voice response (IVR) script corresponding to the customer;
determine that the caller wants to speak to an agent;
establish, with an automatic call distributor (ACD) for the customer, a secure duplex communication channel that is dedicated for use in managing the incoming call, the ACD being outside the service provider network;
inform, via the secure duplex communication channel, the ACD that an agent is needed for the incoming call; and
receive, via the secure duplex communication channel, instructions from the ACD to manage the incoming call.

19. The non-transitory computer-readable medium of claim 18, further comprising instructions to:
receive, via the secure duplex communication channel, instructions to route the incoming call to an available agent identified by the ACD; and
route the incoming call to the available agent.

20. The non-transitory computer-readable medium of claim 19, further comprising instructions to:
receive, via the secure duplex communication channel, instructions to add a coaching leg for a supervisor to join the call between the caller and the available agent; and
add a leg for the supervisor to join the call with the caller and the available agent.

* * * * *